March 19, 1935.  K. D. CHAMBERS  1,995,054
METHOD AND MEANS OF POLY-COLOR X-RAY VISION
Filed Oct. 18, 1923  2 Sheets-Sheet 2
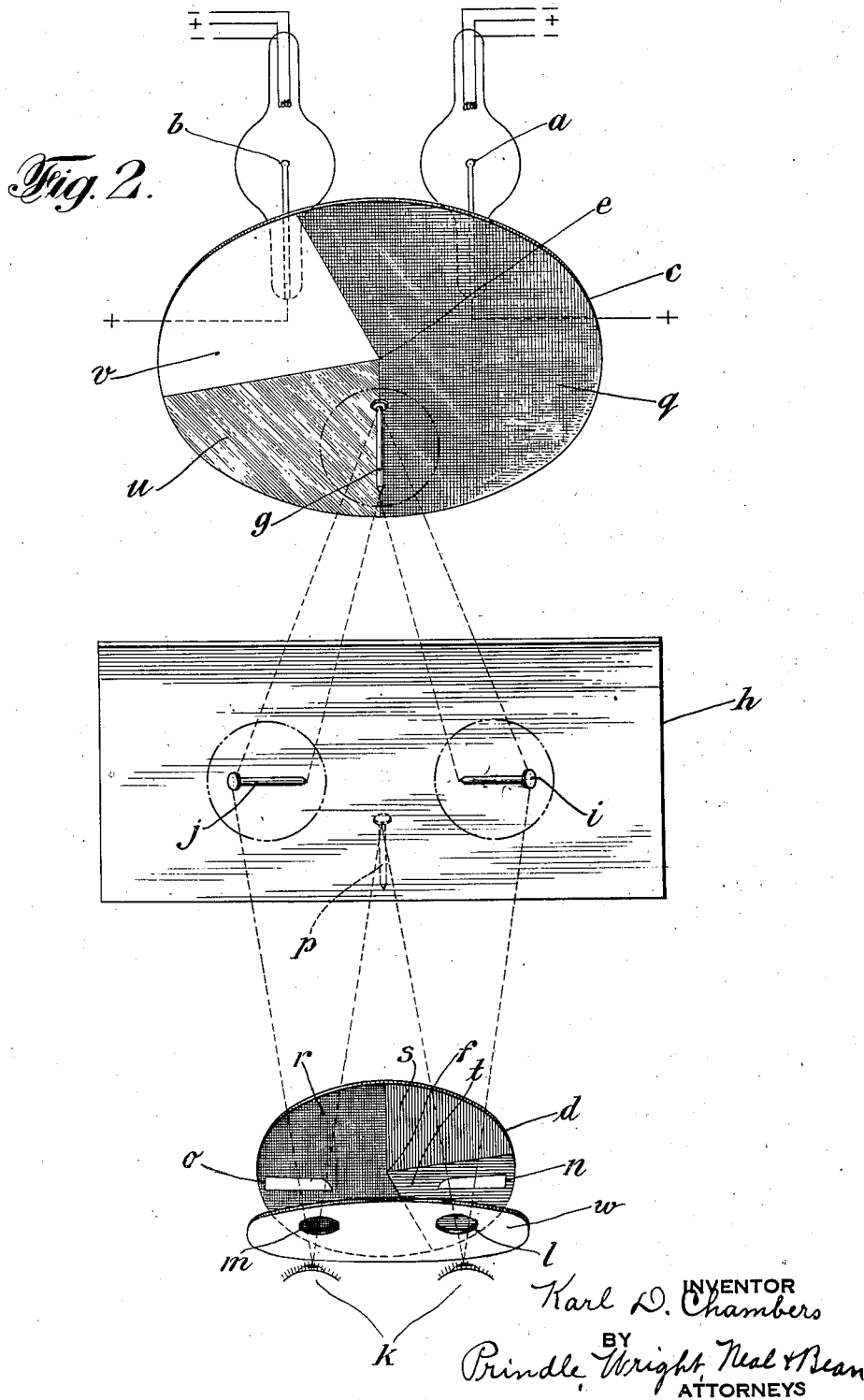

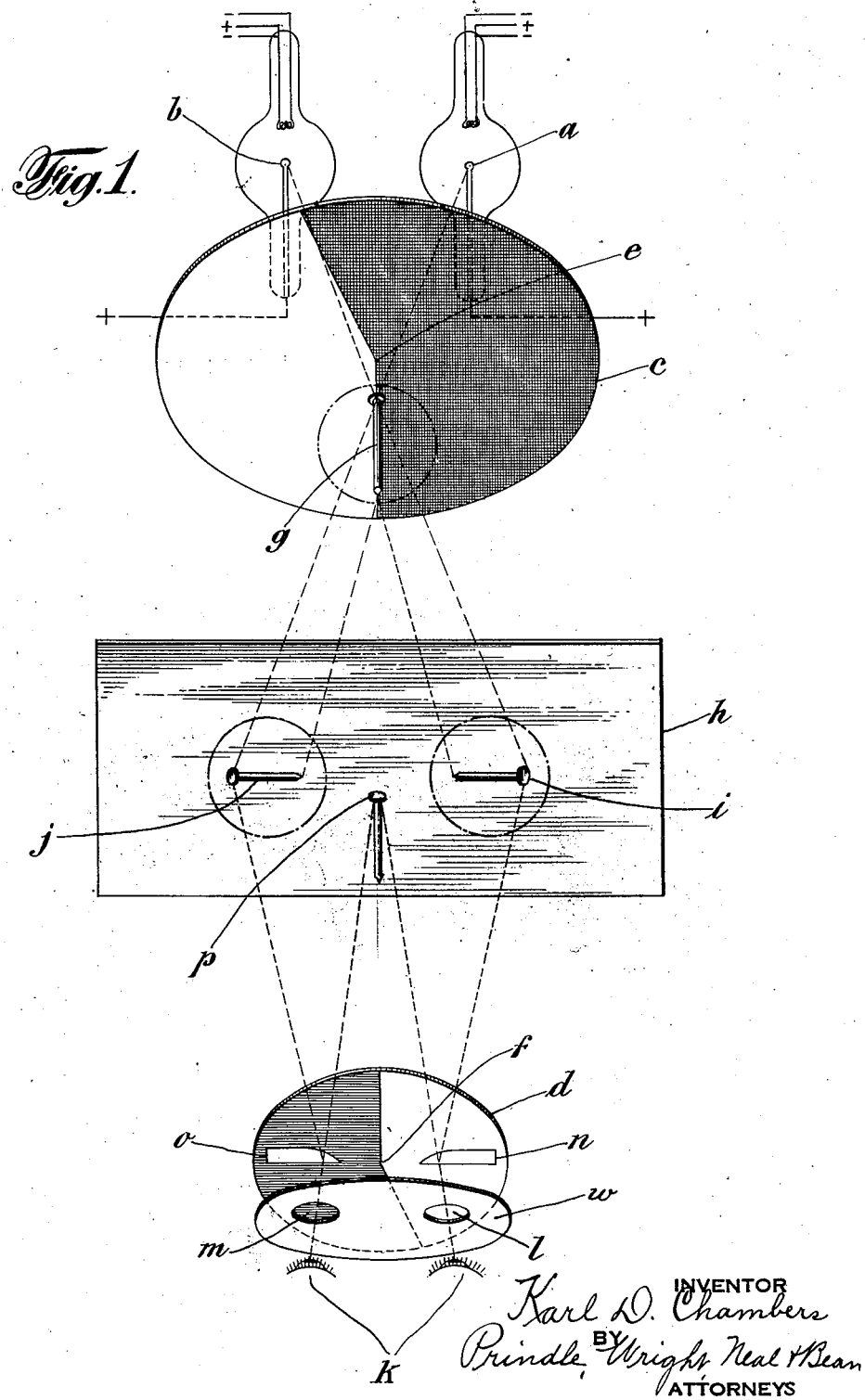

Patented Mar. 19, 1935

1,995,054

UNITED STATES PATENT OFFICE 1,995,054

METHOD AND MEANS OF POLY-COLOR X-RAY VISION

Karl D. Chambers, Montgomery, Ala.; Gertrude Steele Chambers administratrix of said Karl D. Chambers, deceased Application October 18, 1928, Serial No. 313,340

11 Claims. (Cl. 250—34)

This invention has for its purpose the providing of a method and means for enabling an observer to apparently see through an object in perspective with the aid of X-rays. When this system of stereoscopic vision is combined with my poly-color X-ray invention which is the subject of a separate patent application, it forms a method and means of stereoscopic poly-color X-ray vision.

To the accomplishment of the foregoing and such other objects as may hereinafter appear, this invention consists in the construction, combination and arrangement of parts hereinafter described and then sought to be defined in the appended claims, reference being had to the accompanying drawings forming a part hereof and which show, merely for the purpose of illustrative disclosure, a preferred embodiment of my invention, it being expressly understood, however, that various changes may be made in practice within the scope of the claims without digressing from my inventive idea.

In the drawings—

Figure 1 is a diagrammatic perspective view showing the form of my apparatus for monochromatic X-ray pictures the relative positions of two X-ray tubes (a and b), the object (g), fluorescent screen (h), eyes of the observer and two rotating discs (c and d), a lens system (o and n), and a frame (w) in which are two viewing eyepieces (l and m).

Figure 2 is a diagrammatic perspective polychromatic view showing the relative positions of two X-ray tubes (a and b), an object (g), fluorescent screen (h), the eyes of the observer (k), two rotating discs (c and d), a lens system (o and n), and a frame (w) in which are two viewing eyepieces (l and m).

To accomplish the purpose of this invention I use two sources of X-rays (a, and b, Fig. 1), and two revolving discs (c and d) which revolve on their centers (e and f). These discs revolve synchronously and are 180° out of phase. The first disc (c) is between the X-ray tubes and the object to be viewed (g). This disc (c) is made of lead thick enough to stop practically all of the X-rays when its screening part is between a tube source and the object. It has a sector cut out of it of about 160°. The viewing fluorescent screen (h) is placed as close behind the object (g) as convenient.

If the disc of lead (c) were removed while both tubes were operating portions of the images (i and j) of the object might be superimposed. This would make no difference. A second disc (d) opaque to visible light is revolved 180° out of phase and synchronously with the lead disc (c). This second disc (d) has a sector of 160° cut out of it just the same as the lead disc (c). These discs revolve above the critical flicker period so that to the eyes of the observer (k) who is looking through two openings (l and m) which are between the observer's eyes and the disc and are stationary in a frame (w), and through two prism lenses (n and o) at the images (i and j) of the object (g) apparently see a flickerless image (p) at a point about midway between the actual images on the fluorescent screen and sees the image in perspective.

The operation is this: While the lead disc (c) cuts off the rays from the right tube (a) as viewed by the actual observer (k) the left tube (b) throws an image (i) of the object (g) on the fluorescent screen (h) and as the viewing disc (d) is 180° out of phase and in synchronism with the lead disc (c) the visible light of this image (i) is permitted to pass to the right eye of the observer while it is cut off from the left eye. This image (i) appears to be at the place (p) because of the viewing prism lens system (n) in front of the right eye. I have chosen a nail in a wooden sphere as my demonstration object and have placed a sphere between the lead disc (c) and the screen (h) in such a way that the nail lies horizontal, with its sharp end pointed toward the observer. The centers of the discs, the points of radiation of both tubes and the object are shown as all located in the same plane.

Now the discs turn further and at some short interval later the rays from the left X-ray tube (b) will be cut off from reaching the object (g) while the rays from the right X-ray tube (a) will now be permitted to pass and will throw an image (j) of the object (g) on the fluorescent screen (h). As the discs revolve synchronously the light opaque disc (d) will now permit the light from this image (j) to reach the left eye of the observer while it will prevent any of this light from reaching the right eye of the observer. As the image of the nail (j) seen by the left eye is what the eye would have seen had the nail been at the point (p) where the image seems to the left eye to be and as the image of the nail (i) seen by the right eye is what the eye would have seen (that is, of course, I am taking it for granted that when I say "would have seen" I mean theoretically, that is if the eye could see in negative terms and be sensitive to X-ray radiation) had the nail been where and in the position (p) it seems to the right eye to be in,—the result is stereoscopic vision of the object,—that is apparent three dimensional vision. It is also to be noted that point (p) is apparently in front of screen (h) which simplifies measurements and the like.

Color can be added to the stereoscopic vision so as to produce color differentiation as well as density differentiation in this way: Two X-ray tubes (a and b, Fig. 2) of the Coolidge type are used, a rotating disc (c) with a 200° sector of lead (q) heavy enough to stop the emitted X-rays, a fluorescent screen (h) on which the images (i and j) of the object to be viewed (g) are thrown; a second disc (d) that rotates on center (f) that has a 200° sector opaque to ordinary light (r); an 80° sector (s) which passes most rays of wave-length shorter than 5552 A. U. in the visible spectrum and stops most of the other rays in the visible spectrum, and consequently looks like blue green; an 80° sector (t) which is complementary to the blue green sector; two prism lens systems (n and o) so located that the light that comes from the X-ray images (i and j) on the fluorescent screen (h) appears to come from points more nearly midway to both of them so that the images are blended into one image stereoscopically; two eye pieces (l and m) which are between the observer's eyes and the disc and are stationary in a frame (w) through which the observer looks; an 80° aluminum disc (u) about 1.5 c. m. thick; the space (v) of 80° remaining in the lead disc (c) is open; some mechanical or electrical means (not shown on the diagram) for applying at relatively low frequencies either 200,000 or 50,000 volts to the terminals of the X-ray tubes as described later.

In operation the discs move in synchronism and 180° out of phase and the turning on and off the voltages in the tubes is also so synchronized as to make the action occur as follows: When the open space (v) in the lead disc (c) is between the left tube (b) and the object (g) the dark part (r) of the viewing disc (d) is between the left eye of the observer and the fluorescent screen (h) and the red sector (t) is between the right eye of the observer and the image (i), and the 50,000 volt potential is operating the tube (b). Consequently for that brief interval the right eye sees a red image made by X-rays of a longer wave length. The next instant both discs have rotated 80° and the 200,000 volt potential is now operating the same tube (b) and the X-rays from this tube are now much shorter in wave-length due to the much increased voltage, and the longer wave-lengths are stopped by the aluminum sector (u) which now has come between the tube (b) and the image (i), and blue-green sector (s) is now between the right eye of the observer and the image (i) so that for this period of revolution of the discs he sees an image (i) blue-green made by wave-length much shorter than before. The period is so short (less than one thirty-second of a second) that the eye apparently sees the image colored by both colors, and as the two images are not identical owing to the relative differences in absorption of the different parts of the object to different lengths of X-rays there are apparently some parts redder while others are greener or bluer. During these two periods of revolution just described all light has been kept from passing from the fluorescent screen (h) to the left eye of the observer by the opaque sector (r) of the viewing disc (d). Consequently the right eye only sees the image (i) formed by the X-rays from the left X-ray tube (b).

Now both discs revolve 100° and the open space (v) in the lead disc (c) is between the right X-ray tube (a), and the object (g) and the 50,000 volt potential is applied to the tube. The image resulting (j) on the fluorescent screen (h) is viewed through the red sector (t) of the viewing disc (d) which is now between the left eye of the observer and the image (j). Consequently the left eye now sees a red image (j) of the object (g) as cast by the right tube from its particular position. Now the discs rotate 80° more and the right tube (a) has a potential of 200,000 volts. The aluminum sector (u) is filtering out the longer wave-lengths as described above and the image (j) of the object (g) is now made by short wave-length X-rays and it is now viewed by the left eye through the blue-green filter which has now come between the left eye of the observer and the image (j). While both of these last two views were being registered by the left eye in rapid succession, all light has been cut off from reaching the right eye by the light opaque sector (r) of the viewing disc (d).

The discs revolve at constant speed, which is just sufficient to cause the impulses of light reaching the eyes of the observer to be just above (in rapidity) the critical flicker period of the human eye. On account of the prism lenses (n and o) which are in front of the eyes (k) of the observer the left image (j) and the right image (i) both seem to be at a point (p) about midway between where the images really are, and owing to the parallax of the X-ray tube centers the image appears three-dimensional as well as colored.

I have described diagrammatically just the parts of the apparatus necessary to show clearly the operation of this invention. Some things well known in the art such as "grids" and "shields" which should be used herewith I have not shown, as I feel that the including of many of these would only tend to confuse the description. I might say that the grid should of course be put behind the object (g) and between it and the fluorescent screen (h) and should be rotated to obliterate the grid pattern which would otherwise be formed on the screen (h). It probably should be rotated in synchronism with the other two discs. Shields can be used around the object as the case demands.

Electro-magnetic waves other than X-rays can be used for practicing my invention by choosing suitable materials for the differentiating of and cutting off of the rays penetrating whatever kinds of objects are used and by selecting suitable materials for differentiating and cutting off of the light waves coming from the screen or from real optical images used in place of the screen.

Properties other than density to electro-magnetic waves in the object viewed may be studied by stereoscopic vision. For instance optical rotation polarizing power, etc. may be so studied monochromatically or in poly-color. Such studies are, of course, conducted with electromagnetic waves within the visible wave lengths, as is well understood by those familiar with such matters.

I claim:

1. A method of forming a stereoscopic image in colors which consists in successively making two visual images of an object by electromagnetic waves, from each of two different points of view, the images of each of said pairs of visual images being respectively formed by waves differing from each other in predominant lengths, the corresponding images of the two pairs being formed by waves of the same length, and viewing the individual images of each of said pairs of images alternately through a plurality of color filter means, and at such short intervals of time as apparently to make one continuous image in colors.

2. A method of forming, in colors, a stereoscopic image of the matter or physical conditions of an object, which consists in alternately throwing two images of the object from each of two different points of view on a fluorescent screen, by X-rays of different predominant wave lengths, and viewing the pairs of visual images thus formed alternately by one eye of an observer only at a time through a plurality of color filter means, using a separate one of such means for each of said predominant wave lengths of X-rays.

3. A means for forming a stereoscopic image of the matter or physical conditions of an object, comprising the combination of two sources of electro-magnetic waves, means for causing each of said sources to emit waves of different predominant wave lengths, from the same point of view, said points of view being different for each of said sources, means for alternately stopping the waves from these sources from casting images of the object, a screen for rendering said images visible, means for alternately permitting the light from said visible images to reach one eye, only, of an observer, through colored filter means there being a separate color of filter for each predominant wave length, at such periods of time as to make the resulting apparent image seem continuous, there being one such colored filter means for each of said wave lengths.

4. A means for forming a stereoscopic image of the matter or physical conditions of an object, comprising the combination of two sources of electro-magnetic waves, means for causing each of said sources to emit waves of different predominant wave lengths, from the same point of view, said points of view being different for each of said sources means for alternately stopping the waves from these sources from casting said images of the object, a screen for rendering said images visible, means for alternately permitting the light from said visible images to reach one eye, only, of an observer at a time through colored filter means there being a separate color of filter for each predominant wave length, at such periods of time as to make the resulting apparent image seem continuous, there being one such colored filter means for each of said wave lengths, and means for changing the direction of the light traveling from the images, so as to make the images appear to the observer to be in the same place and stereoscopic.

5. A means for forming a stereoscopic image which will disclose the matter or physical conditions of an object, comprising the combination of two sources of electro-magnetic waves, means for causing each said sources to emit waves of different predominant wave lengths, from the same point of view, said points of view being different for each of said sources and thereby to form images, means for rendering said images visible, means for alternately permitting the light from these images to reach one eye only of an observer, at such periods of time as to make the resulting apparent image seem continuous, there being one such colored filter means for each of said wave lengths, and means for changing the direction of the light traveling from the images, so as to make the images appear to the observer to be in the same place and stereoscopic.

6. A method of forming a stereoscopic image which will disclose the matter or physical conditions of an object, which consists in successively making two pairs of visual images of the object by electromagnetic waves, the images of each pair being formed by bands of such waves of predominately different wave lengths, and viewing said pairs of images alternately by the two eyes of an observer, and at such short intervals of time as apparently to make one continuous image.

7. A method of forming a stereoscopic image which will disclose the matter or physical conditions of an object, which consists in successively making two pairs of visual images of the object by electromagnetic waves, the images of each pair being formed by bands of such waves of predominately different wave lengths, and viewing said pairs of images alternately by the two eyes of an observer, and at such short intervals of time as apparently to make one continuous image, the images of each of said pairs which are made by waves of the same predominant lengths being colored alike.

8. A means for forming a stereoscopic image which will disclose the matter or physical conditions of an object, which image shall show by color differentiation, a differentiation between the chemical constituents or the physical conditions of the object, comprising the combination of two sources of electromagnetic waves means for causing each of said sources to emit waves of different predominant wave lengths from the same point of view, said point of view being different for each of said sources, and a means for alternately stopping the waves from these sources from casting images of the object, means for rendering the pairs of images formed by said waves visible, comprising color filter means interposed between said visible images and the eyes of an observer, and means for alternately permitting the light from these images to reach the eyes of an observer through said colored filter means, one eye at a time, and at such periods as to make the resulting apparent image seem continuous, and means for changing the direction of the light travelling from the images so as to make the images to appear to the observer to be in the same place and stereoscopically polychromatic.

9. A method of forming a stereoscopic image which will disclose the matter or physical conditions of an object, comprising alternately making two visible images of an object from each of two different points of view by passing beams of electromagnetic waves of predominantly different wave lengths from each of said points of view and causing the said beams to form visual images, and exposing the visual images from one of said points of view to one eye of an observer, while shielding the said eye from images from the other of said points of view, and vice versa, at such short intervals of time as apparently to make one continuous image.

10. Means for forming a stereoscopic image which will disclose matter within an object or the physical conditions thereof, comprising the combination of two sources of electromagnetic waves, means for causing each of said sources to emit such waves of different predominant wave lengths from the same point of view, said points of view being different for each of said sources, a rotatable disc having a portion impermeable to electromagnetic waves, a second portion permitting the passage of electro-magnetic waves of one of said predominant wave lengths while preventing the passage of waves of substantially different wave lengths, and a third portion permitting the passage of those of another of said predominant wave lengths, a fluorescent screen, said disc being interposed between said scources of electro-magnetic waves and said screen, and an observing disc positioned between said screen and an observer, said observing disc having an opaque portion corresponding in extent with the opaque portion of the first mentioned disc, and having two differently colored filter portions corresponding in position, respectively, to the said second and third portions of said first mentioned disc.

11. Means for forming a stereoscopic image which will disclose the matter or physical conditions within an object comprising the combination of two sources of electro-magnetic waves, means for causing each of said sources to emit such waves of different predominant wave lengths from the same point of view, said points of view being different for each of said sources, a rotatable disc having a portion impermeable to electro-magnetic waves, a second portion permitting the passage of electro-magnetic waves, of one of said predominant wave lengths, while preventing the passage of waves of substantially different wave lengths, and third portion permitting the passage of those of another of said predominant wave lengths, a fluorescent screen, said disc being interposed between said sources of electro-magnetic waves and said screen, an observing disc adapted to be positioned between said screen and an observer, said observing disc having an opaque portion corresponding, in extent, with the opaque portion of the first mentioned disc and having two differently colored filter portions corresponding, in position respectively to the two portions of said first mentioned disc, and means for so changing the direction of the light traveling from said colored images, as to make them appear to the observer to be in the same place and stereoscopic.

KARL D. CHAMBERS.